US011529916B1

United States Patent
Karadeniz et al.

(10) Patent No.: US 11,529,916 B1
(45) Date of Patent: Dec. 20, 2022

(54) MULTIPLEXING SENSOR DATA

(71) Applicant: Zoox, Inc., Foster City, CA (US)

(72) Inventors: Turhan Karadeniz, Oakland, CA (US); Garen Khanoyan, Foster City, CA (US); Ryan McMichael, Mountain View, CA (US)

(73) Assignee: Zoox, Inc., Foster City, CA (US)

( * ) Notice: Subject to any disclaimer, the term of this patent is extended or adjusted under 35 U.S.C. 154(b) by 438 days.

(21) Appl. No.: 16/728,567

(22) Filed: Dec. 27, 2019

(51) Int. Cl.
  *B60R 16/03* (2006.01)
  *G08C 15/06* (2006.01)
  *G05D 1/00* (2006.01)
  *G11B 27/30* (2006.01)
  *H04N 21/2365* (2011.01)

(52) U.S. Cl.
  CPC ....... *B60R 16/0315* (2013.01); *G05D 1/0088* (2013.01); *G08C 15/06* (2013.01); *G11B 27/3036* (2013.01); *H04N 21/2365* (2013.01)

(58) Field of Classification Search
  CPC ............ H04N 21/2365; B60R 16/0315; G05D 1/0088; G08C 15/06; G11B 27/3036
  USPC ................ 709/202, 220, 224, 229; 370/328; 307/52, 53, 71, 10.1; 348/36, 148
  See application file for complete search history.

(56) References Cited

FOREIGN PATENT DOCUMENTS

| WO | WO-2014118563 A1 * | 8/2014 | ........... G06F 1/3287 |
|---|---|---|---|
| WO | WO-2018124774 A1 * | 7/2018 | ........... H04M 1/0264 |

* cited by examiner

*Primary Examiner* — Arnold M Kinkead
(74) *Attorney, Agent, or Firm* — Lee & Hayes, P.C.

(57) ABSTRACT

The described techniques relate to a simulation system that multiplexes sensor data from multiple sensors and outputs the multiplexed sensor data in channels corresponding to the multiple sensors to appropriate vehicle systems at an appropriate time based on encoded timestamp data. In examples, a multiplexer may receive sensor datasets associated with different sensors. The multiplexer may encode the different sensor datasets with timestamp data and supplemental data to generate an encoded dataset. The multiplexer may output the encoded dataset to a video output port to transmit the encoded dataset to a demultiplexer. The demultiplexer receives the encoded dataset from the video output port, and separates the encoded dataset into channels corresponding to the sensors from which the sensor data was received. The demultiplexer may output the datasets in the respective channels at a time (or times) indicated in the timestamp data and according to the supplemental data.

20 Claims, 5 Drawing Sheets

MULTIPLEXING SENSOR DATA

BACKGROUND

Various methods, apparatuses, and systems utilize data from sensors, such as image sensors, lidar sensors, radar sensors, and the like. For example, robotic platforms (e.g., autonomous vehicles) may use image data and/or other sensor data to navigate through environments including obstacles, such as other vehicles, buildings, pedestrians, and so forth. In some examples, sensor data (e.g., simulated, logged, or live) may be used by a vehicle system or other robotic platform to simulate faults or errors to determine how the system will react in such scenarios before the system encounters the scenarios in the real world. Properly aligning sensor data of different types to simulate these scenarios may, at times, present challenges.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features, in accordance with examples of the disclosure.

DETAILED DESCRIPTION

Figure 1:
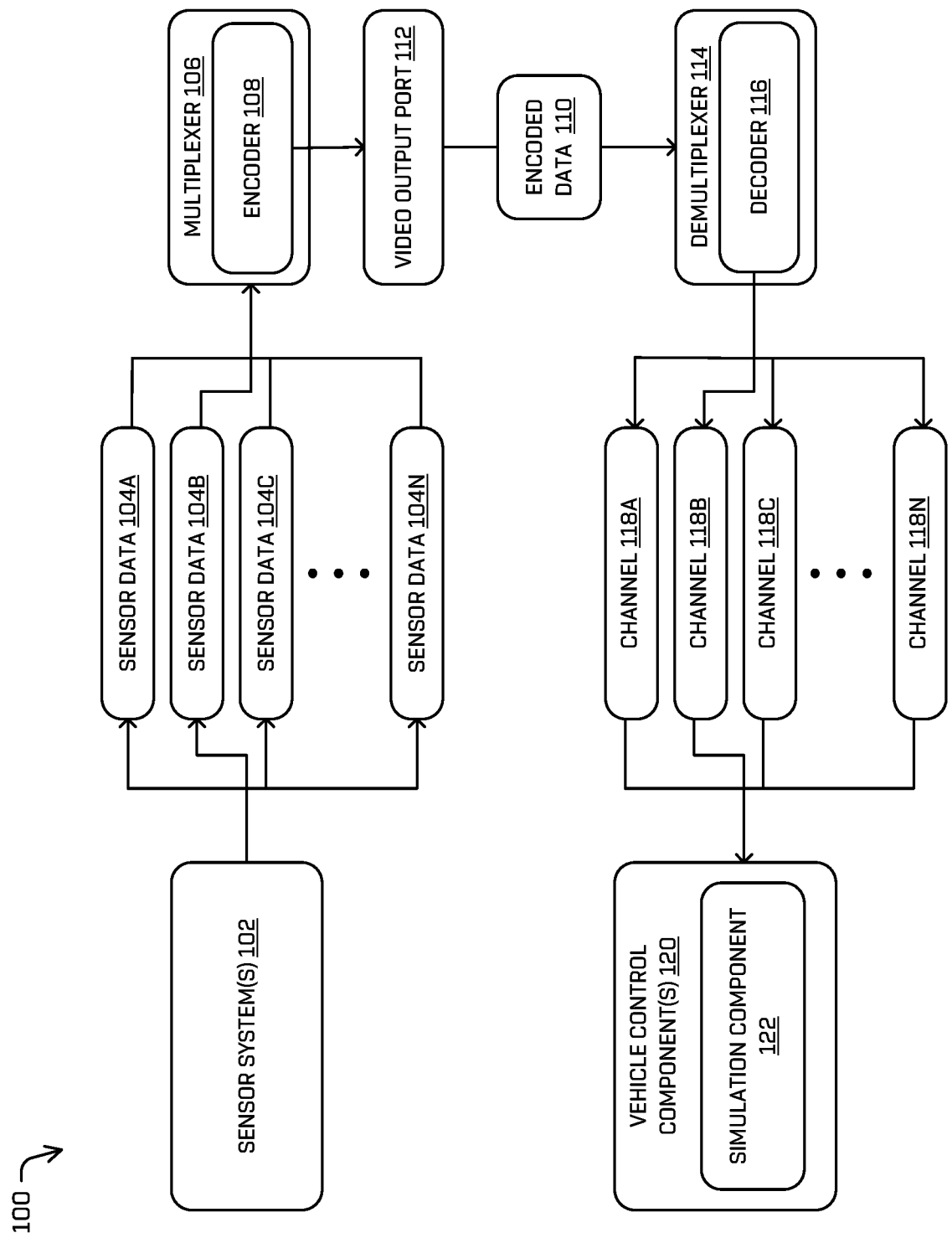
FIG. 1 depicts a block diagram of an example system for multiplexing sensor data, in accordance with examples of the disclosure.

This disclosure relates to multiplexing sensor data corresponding to sensor systems of a vehicle, such as an autonomous vehicle, to provide realistic simulations of scenarios that the vehicle may encounter. In some examples, simulations can be used for generating feedback for improving operations and designs of autonomous vehicles. For instance, simulations can be useful for determining how to modify a behavior of the autonomous vehicle based on what is learned through simulations. Simulations may be used to determine how the autonomous vehicle will react in scenarios where hardware and/or software components experience faults (and/or errors), and may be used to test behavior modifications in response to faults. Conventional simulation systems, however, rely upon injecting faults directly into software components to determine how the autonomous vehicle will react to the faults. Injecting faults directly into software components may, in some cases, cause inaccurate outcomes on behalf of the autonomous vehicle, especially when simulated faults are directed to hardware components, sensor components, and other components located upstream of autonomous vehicle software. Further, conventional systems do not provide an accurate mechanism for inputting sensor data from multiple sensors with accurate timing relative to each other prior to software systems receiving the data for simulations Of course, the techniques described herein need not be so limiting. For instance, in one example, the techniques can be used in real-time in complex systems. In such an example, data from multiple sensors and systems can be aggregated with various metadata (e.g., timestamps) and transmitted to other portions to be subsequently decoded, demultiplexed, and used.

Therefore, the described techniques provide a simulation system that multiplexes sensor data from multiple sensors (and/or encodes such data) and outputs the multiplexed sensor data in channels corresponding to the multiple sensors to appropriate vehicle systems at an appropriate time based on encoded timestamp data. In some examples, the sensor data may be generated or simulated sensor data of a camera, a lidar sensor, a radar sensor, a long-wave infrared sensor, a time or flight sensor, and the like. In the case of generated sensor data, the sensor data may be generated directly from sensors of a vehicle (e.g., in real-time or near real-time), and/or may be log data retrieved from previously generated sensor data.

In examples, a multiplexer may receive sensor data associated with different sensors and/or message data from various components (e.g., a message to control an aspect of the vehicle, a trajectory to follow, predictions of agents in an environment proximate the vehicle, and the like as generated from any one or more systems or subsystems of the vehicle). For instance, the multiplexer may receive a first sensor dataset from a camera, and a second sensor dataset from a lidar sensor. The multiplexer may encode the first dataset and the second dataset with timestamp data and supplemental data to generate an encoded dataset. For example, the timestamp data may indicate a time at which the data is to be output to various vehicle systems of the autonomous vehicle to execute a simulation, a time at which the data was generated, or otherwise. In at least one example, such timestamp information may comprise a timestamp on a per scanline basis for images captured. The supplemental data may include information such as a fault injection parameter that indicates characteristics of a fault to be simulated during the simulation, such as a sensor fault or a hardware fault that would occur prior to software systems of the vehicle receiving the sensor data. Additionally, or alternatively, such supplemental data may comprise, for instance, unique identifier codes, an indication of which systems and/or subsystems used, processed, or generated the data, and the like. In some cases, the multiplexer may combine the first dataset and the second dataset into an ultra-high-resolution image frame, which may further include the timestamp data and supplemental data. Additional details regarding how data may be incorporated into an image frame based on a timestamp can be found in U.S. patent application Ser. No. 16/142,865, which is incorporated by reference herein in its entirety. The multiplexer may output the encoded dataset to a video output port, such as a display port, to transmit the encoded dataset to a demultiplexer. In addition to multiplexing, such data may be encoded into a specific format and/or encryption. As a non-limiting example, such video may be encoded as H.264, H.265, HDMI encoding, and the like.

In some examples, the demultiplexer receives the encoded dataset from the video output port, and decodes and separates the encoded dataset into channels corresponding to the sensors from which the sensor data was received. Continuing with the example above, if the first sensor dataset originates from a camera sensor and a second sensor dataset originates from a lidar sensor, a first channel may contain the first sensor dataset and correspond to the camera sensor, while a second channel may contain the second sensor dataset and correspond to the lidar sensor. Of course, the techniques need to be so limiting. For example, data from the multiple sources may be packed as densely as possible with metadata for the channel indicating how the data should be divided (e.g., lidar and camera data may be contained in a same channel or shared between channels). The demultiplexer may output the datasets in the respective channels at a time (or times) indicated in the timestamp data. The datasets output to the vehicle systems via the channels may include a fault as indicated by the fault injection parameter included in the supplemental data. By including the fault injection parameter in the encoded dataset prior to the channels of data being output to the vehicle systems, a more realistic simulation may be achieved than conventional systems that injected the fault directly into software of the vehicle systems, as a more comprehensive set of systems may be exposed to the fault.

The techniques discussed herein can improve a functioning of a computing device in a number of ways. As discussed above, the simulation system may determine how to behave in the presence of simulated faults based on a computationally-efficient injection of timestamp data and supplemental data prior to the main software systems of the vehicle receiving sensor data. The outcomes and behaviors determined by the simulation system by multiplexing sensing data can enable the autonomous vehicle to make decisions on how to proceed through the environment earlier and with greater confidence. Additionally, the outcomes and behaviors determined by the simulation system can provide a more confident trajectory and/or action in response to a fault indication, as the multiplexed sensor data provides a more accurate representation of sensor and hardware faults. Consequently, significantly less processing resources are used in comparison to conventional techniques that may require multiple fault injections throughout a vehicle software stack at different locations to achieve a similar result. Additionally, such techniques allow for efficiently transmitting data from one machine or component (e.g., a machine storing log data generated from a simulation or from captured data) to another machine or component to act on such data, reducing the kinds and types of hardware necessary to otherwise transfer such data over various protocols.

In some cases, the described techniques are more accurate than other fault simulation mechanisms, thus improving safety of the vehicle and surrounding persons and/or vehicles. For instance, prior systems injected faults directly in to the software systems of the vehicle, which could result in dangerous vehicle behaviors in response to a fault if not all systems affected by a fault were exposed to a fault in a simulation prior to driving. However, the described techniques apply fault simulation parameters immediately after the origination of a sensor or hardware fault, thus exposing vehicle systems to as real of a simulation to these types of faults as possible. Accordingly, controlling the vehicle based in part on outcomes and behaviors determined by multiplexing sensing data in a simulation system can reduce processing resources, by allowing the vehicle to proceed through the environment more efficiently. By controlling the vehicle based in part on outcomes and behaviors determined by multiplexing sensing data in a simulation system, the safety of the autonomous vehicle can be improved by making decisions on how to proceed in the presence of hardware and sensor faults prior to such faults being experienced when the vehicle is traversing the environment. Further, techniques for controlling the vehicle based in part on outcomes and behaviors determined by multiplexing sensing data in a simulation system can increase a confidence that the vehicle can avoid collisions with objects and/or pedestrians by determining the how the vehicle should proceed in the presence of a hardware or sensor fault earlier and with greater accuracy, which may improve safety outcomes, performance, and/or accuracy. These and other improvements to the functioning of the computer are discussed herein.

The techniques described herein can be implemented in a number of ways. Example implementations are provided below with reference to the following figures. Although discussed in the context of an autonomous vehicle, the methods, apparatuses, and systems described herein can be applied to a variety of systems (e.g., a sensor system or a robotic platform), and is not limited to autonomous vehicles. In one example, similar techniques may be utilized in driver-controlled vehicles in which such a system may provide an indication to a driver of the vehicle of whether it is safe to perform various maneuvers. In another example, the techniques can be utilized in an aviation or nautical context, or in any system involving objects or entity that may be associated with behavior that is unknown to the system. Such techniques may also be used, for example, in the context of manufacturing and assembly to inspect components as they move down an assembly line. Additionally, the techniques described herein can be used with real data (e.g., captured using sensor(s)), simulated data (e.g., generated by a simulator), or any combination of the two.

FIG. 1 depicts a block diagram of an example system 100 for multiplexing sensor data, in accordance with examples of the disclosure. In at least one example, the example system 100 can include a vehicle, such as an autonomous, semi-autonomous, or manually controlled vehicle.

For instance, the example system 100 may include one or more sensor system(s) 102. In some examples, the sensor systems 102 may correspond to sensors on a vehicle and/or simulated sensors. The sensor systems 102 may output a variety of sensor data, as indicated by sensor data 104A, sensor data 104B, sensor data 104C, . . . 104N (collectively, sensor data 104). Each of the individual ones of the sensor data 104 may correspond to data output by an individual sensor (or simulated sensor) of the sensor systems 102. For example, the sensor data 104A may correspond to data output by a camera sensor, the sensor data 104B may correspond to data output by a radar sensor, the sensor data 104C may correspond to data output by a lidar sensor, and so forth.

The sensor systems 102 may output the sensor data 104 to a multiplexer 106 that includes an encoder 108. In some examples, the sensor systems 102 may output the sensor data 104 to the multiplexer directly, e.g., in real time (or near real time). However, in some cases, the sensor systems 103 may output the sensor data 104 to a storage device (not pictured) to be stored as log data, and the multiplexer 106 may access the sensor data 104 as part of a simulation subsequent to the sensor data 104 being generated.

Upon receiving the sensor data 104, the encoder 108 of the multiplexer 106 encodes the sensor data 104 into a packet of encoded data 110. In some examples, the encoder 108 may encode the sensor data 104 with the timestamp data and/or supplemental data into an ultra-high-resolution image frame to be used as the packet. The packet may include sensor data generated different sensor types, along with the timestamp data and/or the supplemental data. As described in more detail below in relation to FIG. 3, the timestamp data may indicate a time at which the data should be output to execute a simulation. Further, the supplemental data may include information relating to what types of sensor data 104 are included in the packet, a frame size of the packet, a frame type of the packet, a fault injection parameter to be simulated, one or more vehicle systems to receive data included in the packet, and the like. Encoding the sensor data 104 in this way allows for freedom to customize fault simulations of sensors and/or hardware components prior to the sensor data 104 entering software of the vehicle. For example, the packet may include camera data generated by a camera sensor of a vehicle along with simulated lidar data, a fault injection parameter to simulate a sensor fault of a lidar sensor (e.g., associated with the simulated lidar data), and a time at which the data should be output to various vehicle systems realistically simulate the sensor fault of the lidar sensor.

In some examples, the encoder 108 outputs the packet of the encoded data 110 via a video output port 112 to a demultiplexer 114. The video output port 112 may be a display port, an HDMI port, a serial port, an ethernet port, or a wireless network, to name a few examples. The demultiplexer 114 may include a decoder 116 such as a field-programmable gate array (FPGA), an application-specific integrated circuit (ASIC), and/or a customized circuit board. In examples, the decoder 116 separates the encoded data 110 into a number of channels, such as a channel 118A, a channel 118B, a channel 118C, ... a channel 118N (collectively "channels 118"). Each of the channels 118 may correspond to a respective one of the sets of the sensor data 104. For instance, the channel 118A may include the sensor data 104A, the channel 118B may include the sensor data 104B, the channel 118C may include the sensor data 104C, and so on.

The demultiplexer 114 may use the timestamp data and the supplemental data included in the packet of the encoded data 110 to determine how and when to output the sensor data 104 included in the channels 118. For example, the demultiplexer 114 may determine, from the supplemental data included in a header of the packet of the encoded data 110 and/or in metadata associated with individual ones of the sensor data 104, which vehicle systems are to receive the channels 118. Alternatively or additionally, the demultiplexer 114 may determine, from the timestamp data included in a header of the packet of the encoded data 110 and/or in metadata associated with individual ones of the sensor data 104, a time (or times) at which the channels 118 are to be output to one or more vehicle systems. Based on this information, the demultiplexer 114 may output the channels 118 to one or more vehicle control component(s) 120. In some cases, the vehicle control components 120 may be included in various systems of a vehicle, such as a localization component, a perception component, a system controller, a prediction component, a planning component, and/or a drive system, which are described in more detail in relation to FIG. 4. Alternatively or additionally, the channels 118 may be output to a simulation component 112 of the vehicle control components 120, which is configured to execute a vehicle simulation in accordance with fault injection parameters included in the encoded data 110 and represented by the data included in the channels 118. In some examples, the simulation component 122 may monitor how the vehicle responds to the fault represented by the data included in the channels 118, output results of the simulation (e.g., to a remote computing device), and/or may determine behaviors for the vehicle to execute in response to the fault represented by the data included in the channels 118.

Figure 2:
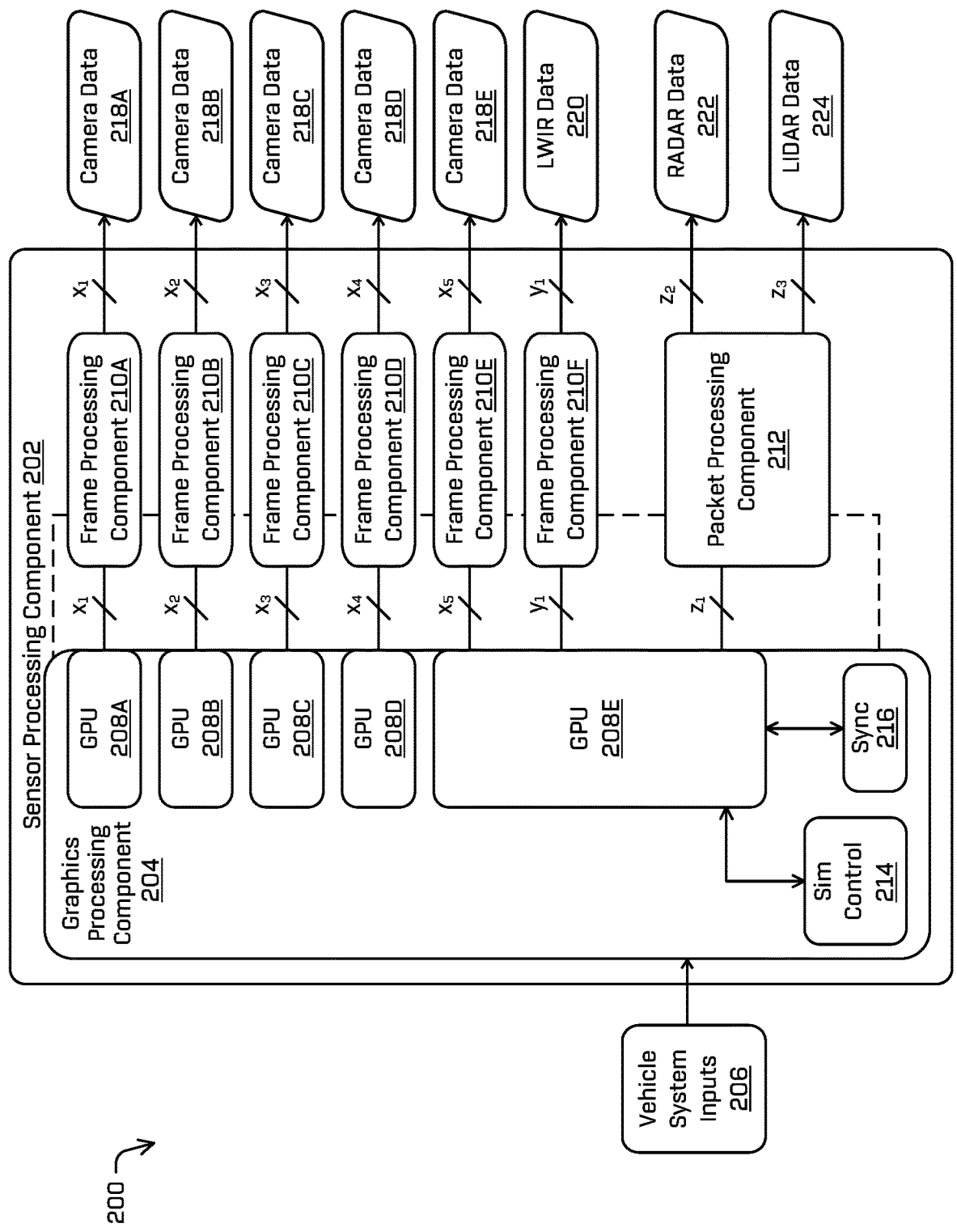
FIG. 2 is an illustration of an example system including a graphics processing component, a number of frame processing components, and a packet generation component which may be used to multiplex different types of sensor data, in accordance with examples of the disclosure.

FIG. 2 is an illustration of an example system 200 including a graphics processing component, a number of frame processing components, and a packet generation component which may be used to multiplex different types of sensor data, in accordance with examples of the disclosure.

In examples, a sensor processing component 202 may include a graphics processing component 204 that receives vehicle system inputs 206 from various systems of a vehicle, as described herein. The vehicle system inputs 206 may include real-time sensor data, log sensor data, simulated sensor data, and/or other data as generated by various vehicle systems or simulators. The graphics processing component 204 may be a video card and/or motherboard that includes a graphics processing unit (GPU) 208A, a GPU 208B, a GPU 208C, a GPU 208D, and/or a GPU 208E (collectively, "GPUs 208"). The GPUs 208 may be specialized electronic circuits designed to create images in a frame buffer. In some examples, each of the GPUs 208 may have one or more corresponding frame processing components, as indicated by a frame processing component 210A, a frame processing component 210B, a frame processing component 210C, a frame processing component 210D, a frame processing component 210E, and a frame processing component 210F (collectively, "frame processing components 210"). Additionally, in some cases, at least one of the GPUs 208 (in this case, the GPU 208E) may be associated with a packet processing component 212 along with one or more of the frame processing components 210 (in this case, the frame processing component 210E and the frame processing component 210F). Further, the graphics processing component 204 may include a simulation ("sim") control 214 configured to generate, monitor, and output results of simulations executed by a vehicle or other robotic platform associated with the sensor processing component 202. The graphics processing component 204 may also include a sync 216 configured to synchronize the vehicle system inputs 206 to be output to different vehicle systems according to parameters of a simulation, for example.

In some examples, the vehicle system inputs 206 may include data from one or more cameras. The GPUs 208 may receive the camera data included in the vehicle system inputs 206 and generate image frames based on the camera data. The GPUs 208 may output a number of streams of frames associated with a number of cameras assigned to each respective GPU to the frame processing components 210. For example, the GPU 208A may receive data from four cameras, and may generate and output four corresponding streams of frames to the frame processing component 210A (e.g., indicated by $x_1$ between the GPU 208A and the frame processing component 210A). The reference indicators $x_1$-$x_5$, $y_1$, $z_1$, $z_2$, and $z_3$ indicate a number of channels between the various components, where each reference indicator may be an integer greater than 0, and each channel may correspond to one or more sensors.

The frame processing components 210 may process the frames received from the GPUs 208, such as by adding metadata to the frames associated with camera pose, timing, and the like. The frame processing components 210 may then output camera data 218A, 218B, 218C, 218D, and/or 218E (collectively, "camera data 218") that includes the frames in channels to various vehicle components. Continuing with the above example, the frame processing component 210A may output four channels of camera data 218A corresponding to the four cameras from which the GPU 208A received data (e.g., indicated by $x_1$ from the frame processing component 210A). The GPU 208E may process long-range infrared (LWIR) data received from LWIR cameras similarly, as indicated by LWIR data 220.

In some examples, the GPU 208E may generate an image frame (e.g., an ultra-high-resolution image frame) that includes sensor data other than (or in addition to) camera data. For instance, the GPU 208E may receive radar data, lidar data, time of flight data, and the like, and incorporate such data into an image frame. Additionally, in some examples, the GPU 208E may include supplemental data in the image frame, such as the types of sensor data included in the image frame. For example, the GPU 208E may receive a timing determination from the sync 216 to include in the image frame. The timing determination may indicate latencies attributed to the different sensor data types, and accordingly how the different sensor data types should be output to vehicle systems from the packet processing component 212 to accurately represent sensors of a vehicle. The GPU 208E may include the timing determination as timestamp data in the image frame. Alternatively or additionally, the GPU 208E may receive simulation data from the sim control 214 to include in the image frame. The simulation data may include information such as which systems of a vehicle to send the sensor data to, and/or fault injection parameters associated with a simulated fault of one or more of the sensors of the vehicle. The GPU 208E may include the simulation data as supplemental data in the image frame.

The GPU 208E may output the image frame that includes the sensor data other than (or in addition to) camera data to the packet processing component 212. The packet processing component 212 may output the sensor data in channels corresponding to the different sensor data types (e.g., one channel per sensor) and according to the timestamp data and supplemental data included in the image frame. In some examples, the packet processing component 212 may separate the image frame based on sensor data from different sensors, such that the sensor data can be included in corresponding channels to be output by the packet processing component 212. In the example shown, the packet processing component 212 may receive a number of channels (e.g., $z_1$) of sensor data, and output a number of channels (e.g., $z_2$) of radar data 222 along with a number of channels (e.g., $z_3$) of lidar data 224 to various vehicle systems according to data included in the image frame. In some cases, the total number of channels received by the packet processing component 212 (e.g., $z_1$) may not be equal the total number of channels output by the packet processing component 212 (e.g., $z_2$ plus $z_3$), as the packet processing component 212 receives the radar data 222 and the lidar data 224 in a single image frame and outputs the radar data 222 and the lidar data 224 in individual channels corresponding to individual sensors.

Figure 3:
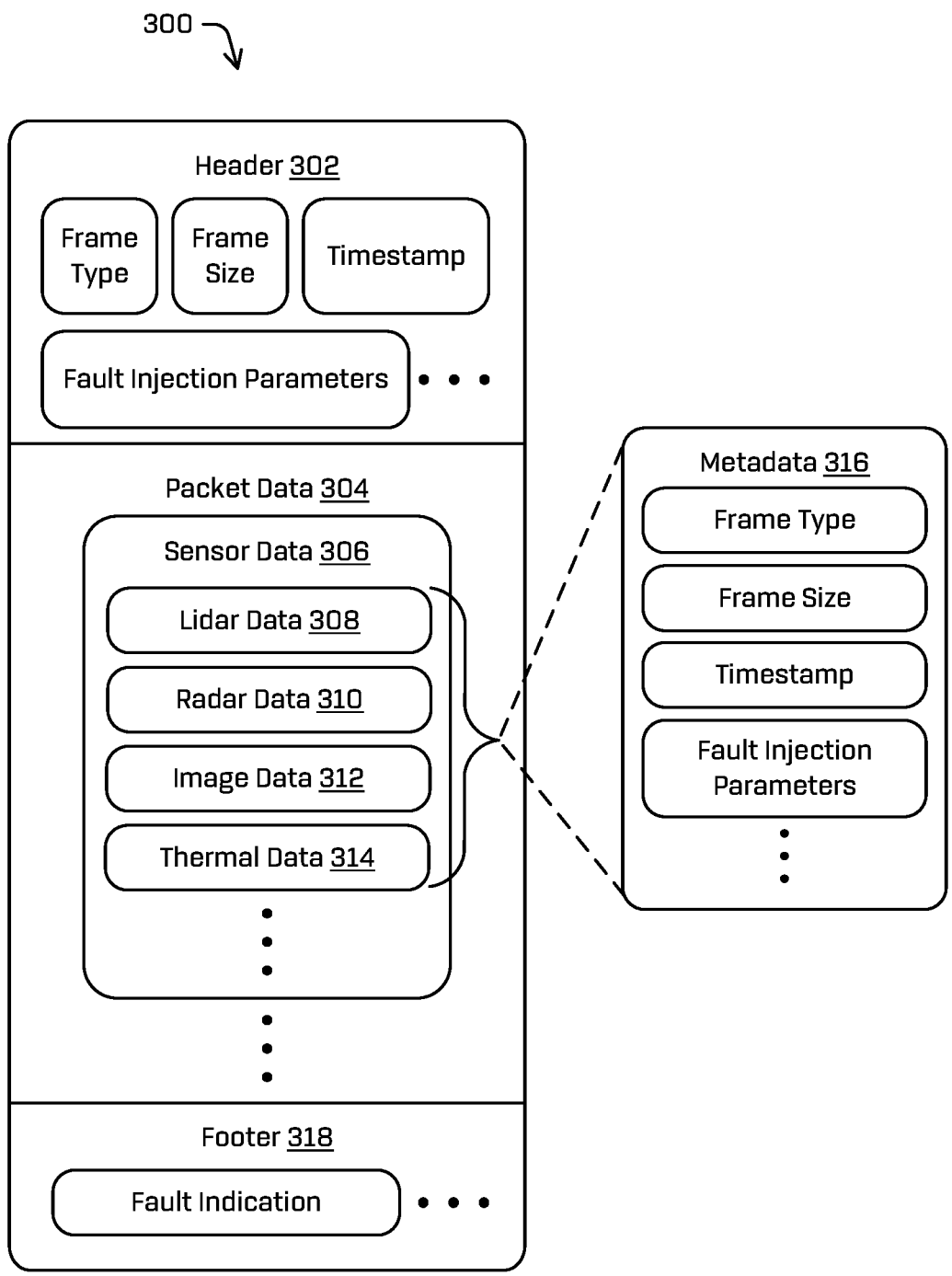
FIG. 3 is an illustration of an example packet that may include different sensor data types, in accordance with examples of the disclosure.

FIG. 3 is an illustration of a packet 300 that may include different sensor data types, in accordance with examples of the disclosure.

In some examples, the packet 300 may be an image frame (e.g., an ultra-high-resolution image frame or other frame type) generated by a GPU (e.g., the GPU 208E) and/or by an encoder (e.g., the encoder 108) as described above. The packet 300 may include a header 302 that includes various information about the packet 300, such as frame type, frame size, timestamp data, fault injection parameters, and the like. In examples, the timestamp data may indicate when data included in the packet 300 should be output by a decoder (e.g., the decoder 116) or packet processing component (e.g., the packet processing component 212), and the fault injection parameters may indicate a simulated fault of a sensor and/or of a hardware component.

Additionally, in examples, the packet 300 may include packet data 304, which includes sensor data 306 to be transmitted according to the timestamp indicated in the header 302. In some cases, the packet data 304 may include multiple instances of sensor data 306, which may be transmitted according to corresponding timestamp data included in the header 302. The sensor data may include lidar data 308, radar data 310, image data 312, thermal data 314, and/or other types of sensor data. Each one of the lidar data 308, the radar data 310, the image data 312, and/or the thermal data 314 may include metadata 316 associated with the data type in the packet data 304. The metadata 316 may include data similar to the data found in the header 302, such as frame type, frame size, timestamp data, fault injection parameters, and the like. However, in some cases, the metadata 316 may contain information specific to the type of sensor data with which the metadata 316 is associated. For example, the timestamp data included in the header 302 may include an indication of when the packet data 304 is to be output by the decoder 116, while the timestamp data included with the lidar data 308 may include a timestamp for when the lidar data 308 was generated (e.g., by a lidar sensor or simulator). However, examples are considered in which the data included in the header 302 is the same as data included in individual ones of the sensor data 306, such as the frame type and frame size of the packet 300.

The packet 300 may further include a footer 318, which may include information such as a fault indication of a fault to be simulated by a vehicle upon output of the packet 300 to various vehicle systems. For instance, the fault indication included in the footer 318 such as which sensor or hardware component the fault injection parameters are directed to, that the fault injection parameters are part of a simulation, and the like.

Figure 4:
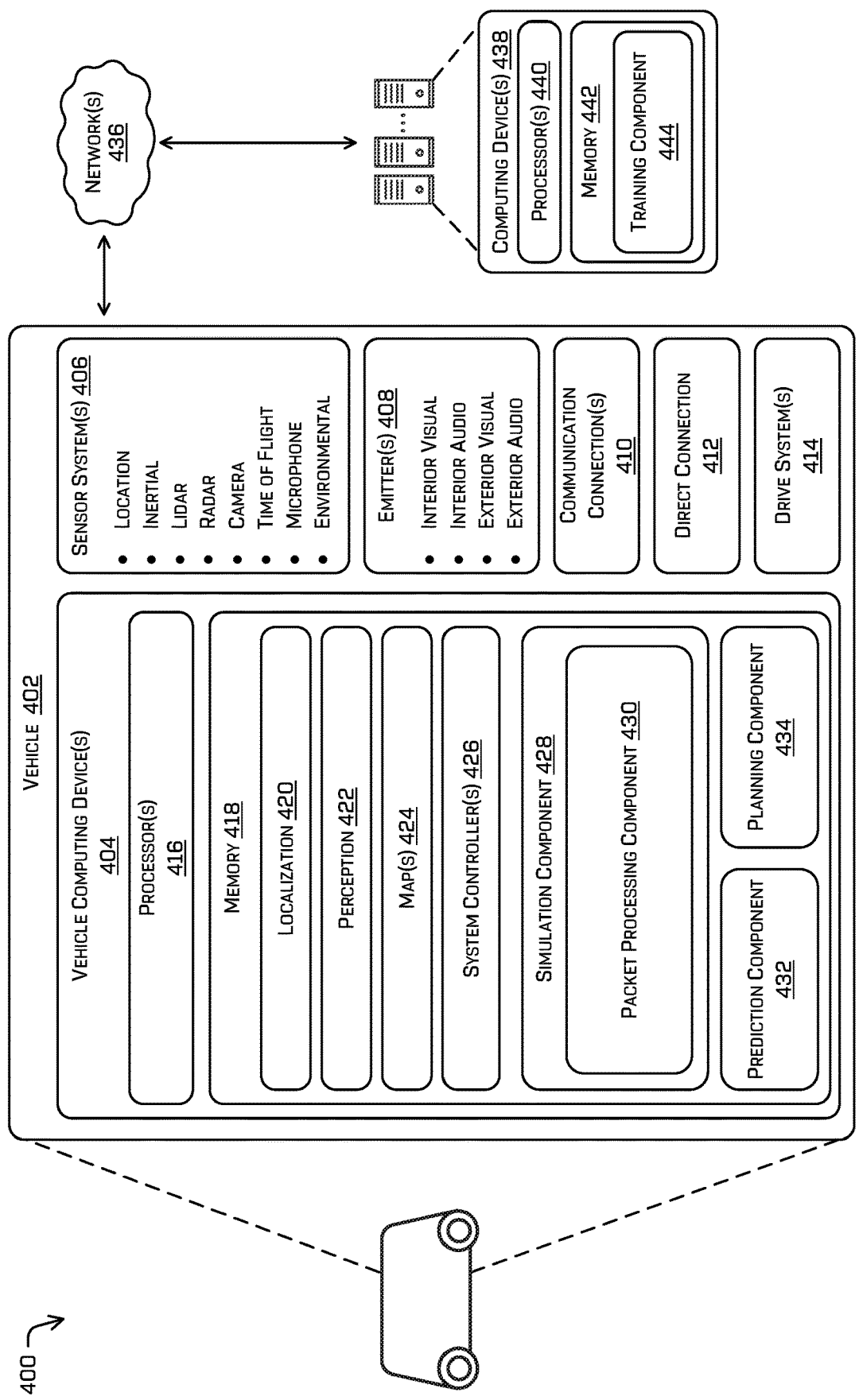
FIG. 4 depicts a block diagram of an example system for implementing the techniques described herein.

FIG. 4 depicts a block diagram of an example system for implementing the techniques described herein. In at least one example, the system 400 can include a vehicle 402, such as an autonomous, semi-autonomous, or manually controlled vehicle. In some examples the vehicle 402 may correspond to the vehicle 102 of FIG. 1.

The vehicle 402 can include vehicle computing device(s) 404, one or more sensor systems 406, one or more emitters 408, one or more communication connections 410, at least one direct connection 412, and one or more drive systems 414.

The vehicle computing device(s) 404 can include one or more processors 416 and memory 418 communicatively coupled with the one or more processors 416. In the illustrated example, the vehicle 402 is an autonomous vehicle; however, the vehicle 402 could be any other type of vehicle or robotic platform. In the illustrated example, the memory 418 of the vehicle computing device(s) 404 stores a localization component 420, a perception component 422, one or more maps 424, one or more system controllers 426, a simulation component 428, a packet processing component 430, a prediction component 432, and a planning component 434. Though depicted in FIG. 4 as residing in the memory 418 for illustrative purposes, it is contemplated that the localization component 420, the perception component 422, the one or more maps 424, the one or more system controllers 426, the simulation component 428, the packet processing component 430, the prediction component 432, and the planning component 434 can additionally, or alternatively, be accessible to the vehicle 402 (e.g., stored on, or otherwise accessible by, memory remote from the vehicle 402).

In at least one example, the localization component 420 can include functionality to receive data from the sensor system(s) 406 to determine a position and/or orientation of the vehicle 402 (e.g., one or more of an x-, y-, z-position, roll, pitch, or yaw). For example, the localization component 420 can include and/or request/receive a map of an environment and can continuously determine a location and/or orientation of the autonomous vehicle within the map. In some instances, the localization component 420 can utilize SLAM (simultaneous localization and mapping), CLAMS (calibration, localization and mapping, simultaneously), relative SLAM, bundle adjustment, non-linear least squares optimization, or the like to receive image data, lidar data, radar data, time of flight data, IMU data, GPS data, wheel encoder data, and the like to accurately determine a location of the autonomous vehicle. In some instances, the localization component 420 can provide data to various components of the vehicle 402 to determine an initial position of an autonomous vehicle for generating a trajectory, for determining to retrieve map data, and so forth, as discussed herein.

In some instances, the perception component 422 can include functionality to perform object detection, segmentation, and/or classification. In some examples, the perception component 422 can provide processed sensor data that indicates a presence of an entity that is proximate to the vehicle 402 and/or a classification of the entity as an entity type (e.g., car, truck, pedestrian, cyclist, animal, building, tree, road surface, curb, sidewalk, stoplight, stop sign, lane marker, unknown, etc.). In additional or alternative examples, the perception component 422 can provide processed sensor data that indicates one or more characteristics associated with a detected entity (e.g., a tracked object) and/or the environment in which the entity is positioned. In some examples, characteristics associated with an entity can include, but are not limited to, an x-position (global and/or local position), a y-position (global and/or local position), a z-position (global and/or local position), an orientation (e.g., a roll, pitch, yaw), an entity type (e.g., a classification), a velocity of the entity, an acceleration of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc.

In those examples in which perception component 422 performs detection, the perception component 422 may output detections of objects in an image. Such detections may comprise two-dimensional bounding boxes and/or masks of detected objects. In some examples, such detection may utilize a machine learning approach (e.g., scale-invariant feature transform (SIFT), histogram of oriented gradients (HOG), etc.) followed by a support vector machine (SVM) to classify objects depicted in images received from a camera of the sensor system 406. Alternatively or additionally, detection may utilize a deep learning approach based on a convolutional neural network (CNN) to classify objects depicted in images received from a camera of the sensor system 406. As described herein, the perception component 422 may output detections of objects and/or other processed sensor data to the planning component 436 at intervals, thus allowing the planning component 436 to make object predictions and/or generate a trajectory for the vehicle 402 to follow to traverse the environment.

The memory 418 can further include one or more maps 424 that can be used by the vehicle 402 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map can include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map can include a three-dimensional mesh of the environment. In some instances, the map can be stored in a tiled format, such that individual tiles of the map represent a discrete portion of an environment, and can be loaded into working memory as needed. In at least one example, the one or more maps 424 can include at least one map (e.g., images and/or a mesh). In some examples, the vehicle 402 can be controlled based at least in part on the maps 424. That is, the maps 424 can be used in connection with the localization component 420, the perception component 422, the simulation component 428, the prediction component 432, and/or the planning component 434, to determine a location of the vehicle 402, identify objects in an environment, and/or generate routes and/or trajectories to navigate within an environment.

In some examples, the one or more maps 424 can be stored on a remote computing device(s) (such as the computing device(s) 440) accessible via network(s) 438. In some examples, multiple maps 424 can be stored based on, for example, a characteristic (e.g., type of entity, time of day, day of week, season of the year, etc.). Storing multiple maps 424 can have similar memory requirements, but increase the speed at which data in a map can be accessed. In some examples, the one or more maps 424 can store sizes or dimensions of objects associated with individual locations in an environment. For example, as the vehicle 402 traverses the environment and as maps representing an area proximate to the vehicle 402 are loaded into memory, one or more sizes or dimensions of objects associated with a location can be loaded into memory as well.

The simulation component 428 may receive, generate, and/or access sensor data to be used in a simulation for the vehicle 402, such as from the sensor systems 406 and/or the computing devices 438, among others as described herein. Additionally, the simulation component 428 may monitor how the vehicle 402 responds to a simulation that may include faults attributed to sensors of the vehicle (e.g., directly included in sensor data from the sensor systems 406, simulated sensor data, and/or from log data retrieved from the remote computing device 438). In some examples, the simulation component 428 may determine behaviors for the vehicle 402 to execute in response to a fault attributed to sensors of the vehicle, such as part of a simulation.

For instance, the simulation component 428 may include a packet processing component 430 (which may correspond to the packet processing component 212 described above). The packet processing component 430 may receive a variety of sensor data from the sensor systems 406, such as camera data, lidar data, radar data, long-range infrared data, and the like as described herein. In examples, the packet processing component 430 may include an encoder that encodes the various types of data into a packet of encoded data along with timestamp information and supplemental information. The packet processing component 430 may determine the timestamp information based on when the sensor data included in the packet should be output to various vehicle systems of the vehicle 402. Additionally, the packet processing component 430 may indicate which of the systems of the vehicle 402 are to receive the sensor data in the supplemental data included in the packet, and/or include a fault injection parameter in the supplemental data included in the packet that corresponds to a fault (e.g., a simulated fault) of a sensor and/or a hardware system of the vehicle 402.

In some examples, the packet processing component 430 may also include a decoder that receives the packet from the encoder and outputs the sensor data via channels corresponding to individual sensors according to the timestamp data and the supplemental data included in the packet. For instance, the packet processing component 430 may output the sensor data via the one or more channels to the localization component 420, the perception component 422, the system controllers 426, the prediction component 432, the planning component 434, and/or the drive systems 414 according to the timestamp data included in the packet. By outputting the sensor data to the vehicle systems according to the supplemental data and the timestamp data, the packet processing component 430 may enable more realistic simulations of sensor faults and/or hardware faults than conventional systems that injected faults into the software of the localization component 420, the perception component 422, the system controllers 426, the prediction component 432, the planning component 434, and/or the drive systems 414 directly.

The prediction component 432 can generate predictions of object behavior based at least in part on sensor data received form the sensor system 406, and/or from data received via channels corresponding to sensors from the packet processing component 430. For example, the prediction component 432 may generate one, or multiple, predicted trajectories for an object detected in the environment. Additionally, in some cases, the prediction component 432 can determine variances in position, location, speed, acceleration, and the like for each predicted trajectory generated for a particular object. The prediction component 432 may output the predicted trajectories to the planning component 434 (e.g., at intervals) to use in generating a trajectory for the vehicle 402 to follow to traverse the environment.

In general, the planning component 434 can determine a path for the vehicle 402 to follow to traverse the environment. For example, the planning component 434 can determine various routes and trajectories and various levels of detail. For example, the planning component 434 can determine a route to travel from a first location (e.g., a current location) to a second location (e.g., a target location). For the purpose of this discussion, a route can be a sequence of waypoints for travelling between two locations. As non-limiting examples, waypoints include streets, intersections, global positioning system (GPS) coordinates, etc. Further, the planning component 434 can generate an instruction for guiding the autonomous vehicle along at least a portion of the route from the first location to the second location. In at least one example, the planning component 434 can determine how to guide the autonomous vehicle from a first waypoint in the sequence of waypoints to a second waypoint in the sequence of waypoints. In some examples, the instruction can be a trajectory, or a portion of a trajectory. In some examples, multiple trajectories can be substantially simultaneously generated (e.g., within technical tolerances) in accordance with a receding horizon technique, wherein one of the multiple trajectories is selected for the vehicle 402 to navigate. In some examples, the planning component 434 can use temporal logic, such as linear temporal logic and/or signal temporal logic, to evaluate one or more trajectories of the vehicle 402.

In at least one example, the vehicle computing device(s) 404 can include one or more system controllers 426, which can be configured to control steering, propulsion, braking, safety, emitters, communication, and other systems of the vehicle 402. These system controller(s) 426 can communicate with and/or control corresponding systems of the drive system(s) 414 and/or other components of the vehicle 402.

As can be understood, the components discussed herein (e.g., the localization component 420, the perception component 422, the one or more maps 424, the one or more system controllers 426, the simulation component 428, the packet processing component 430, the prediction component 432, and/or the planning component 434) are described as divided for illustrative purposes. However, the operations performed by the various components can be combined or performed in any other component. By way of example, functions described in relation to the simulation component 428, the packet processing component 430, the prediction component 432, and/or the planning component 434 may be performed by the perception component 422 to reduce the amount of data transferred by the system.

In at least one example, the sensor system(s) 406 can include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 406 can include multiple instances of each of these or other types of sensors. For instance, the lidar sensors can include individual lidar sensors located at the corners, front, back, sides, and/or top of the vehicle 402. As another example, the camera sensors can include multiple cameras disposed at various locations about the exterior and/or interior of the vehicle 402. The sensor system(s) 406 can provide input to the vehicle computing device(s) 404. Additionally or alternatively, the sensor system(s) 406 can send sensor data, via the one or more networks 436, to the one or more computing device(s) at a particular frequency, after a lapse of a predetermined period of time, in near real-time, etc.

The vehicle 402 can also include one or more emitters 408 for emitting light and/or sound, as described above. The emitters 408 in this example include interior audio and visual emitters to communicate with passengers of the vehicle 402. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitters 408 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 402 can also include one or more communication connection(s) 410 that enable communication between the vehicle 402 and one or more other local or remote computing device(s). For instance, the communication connection(s) 410 can facilitate communication with other local computing device(s) on the vehicle 402 and/or the drive system(s) 414. Also, the communication connection(s) 410 can allow the vehicle to communicate with other nearby computing device(s) (e.g., other nearby vehicles, traffic signals, etc.). The communication connection(s) 410 also enable the vehicle 402 to communicate with a remote teleoperations computing device or other remote services.

The communication connection(s) 410 can include physical and/or logical interfaces for connecting the vehicle computing device(s) 404 to another computing device or a network, such as network(s) 436. For example, the communications connection(s) 410 can enable Wi-Fi-based communication such as via frequencies defined by the IEEE 802.11 standards, short range wireless frequencies such as Bluetooth®, cellular communication (e.g., 2G, 3G, 4G, 4G LTE, 4G, etc.) or any suitable wired or wireless communications protocol that enables the respective computing device to interface with the other computing device(s).

In at least one example, the vehicle 402 can include one or more drive systems 414. In some examples, the vehicle 402 can have a single drive system 414. In at least one example, if the vehicle 402 has multiple drive systems 414, individual drive systems 414 can be positioned on opposite ends of the vehicle 402 (e.g., the front and the rear, etc.). In at least one example, the drive system(s) 414 can include one or more sensor systems to detect conditions of the drive system(s) 414 and/or the surroundings of the vehicle 402. By way of example and not limitation, the sensor system(s) can include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive system, lidar sensors, radar sensors, etc. Some sensors, such as the wheel encoders can be unique to the drive system(s) 414. In some cases, the sensor system(s) on the drive system(s) 414 can overlap or supplement corresponding systems of the vehicle 402 (e.g., sensor system(s) 406).

The drive system(s) 414 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 414 can include a drive system controller which can receive and preprocess data from the sensor system(s) and to control operation of the various vehicle systems. In some examples, the drive system controller can include one or more processors and memory communicatively coupled with the one or more processors. The memory can store one or more components to perform various functionalities of the drive system(s) 414. Furthermore, the drive system(s) 414 also include one or more communication connection(s) that enable communication by the respective drive system with one or more other local or remote computing device(s).

In at least one example, the direct connection 412 can provide a physical interface to couple the one or more drive system(s) 414 with the body of the vehicle 402. For example, the direct connection 412 can allow the transfer of energy, fluids, air, data, etc. between the drive system(s) 414 and the vehicle. In some instances, the direct connection 412 can further releasably secure the drive system(s) 414 to the body of the vehicle 402.

In at least one example, the localization component 420, the perception component 422, the one or more maps 424, the one or more system controllers 426, the simulation component 428, the packet processing component 430, the prediction component 432, and/or the planning component 434 can process sensor data, as described above, and can send their respective outputs, over the one or more network(s) 436, to one or more computing device(s) 438. In at least one example, the localization component 420, the perception component 422, the one or more maps 424, the one or more system controllers 426, the simulation component 428, the packet processing component 430, the prediction component 432, and/or the planning component 434 can send their respective outputs to the one or more computing device(s) 438 at a particular frequency, after a lapse of a predetermined period of time, in near real-time, etc.

In some examples, the vehicle 402 can send sensor data to one or more computing device(s) 438 via the network(s) 436. In some examples, the vehicle 402 can send raw sensor data to the computing device(s) 438. In other examples, the vehicle 402 can send processed sensor data and/or representations of sensor data to the computing device(s) 438. In some examples, the vehicle 402 can send sensor data to the computing device(s) 438 at a particular frequency, after a lapse of a predetermined period of time, in near real-time, etc. In some cases, the vehicle 402 can send sensor data (raw or processed) to the computing device(s) 438 as one or more log files.

The computing device(s) 438 can include processor(s) 440 and a memory 442 storing a training component 444.

In some instances, the training component 444 can include functionality to train one or more models to detect objects in an environment, predict object behavior, and the like. For instance, aspects of some or all of the components discussed herein can include any models, algorithms, and/or machine learning algorithms. For example, in some instances, the components in the memory 442 (and the memory 418, discussed above) can be implemented as a neural network. In some examples, the training component 444 can utilize a neural network to generate and/or execute one or more models to improve various aspects of object behavior prediction for use in trajectory planning of the vehicle 402.

As described herein, an exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet50, ResNet101, VGG, DenseNet, PointNet, and the like.

The processor(s) 416 of the vehicle 402 and the processor(s) 440 of the computing device(s) 438 can be any suitable processor capable of executing instructions to process data and perform operations as described herein. By way of example and not limitation, the processor(s) 416 and 440 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

Memory 418 and 442 are examples of non-transitory computer-readable media. The memory 418 and 442 can store an operating system and one or more software applications, instructions, programs, and/or data to implement the methods described herein and the functions attributed to the various systems. In various implementations, the memory can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

It should be noted that while FIG. 4 is illustrated as a distributed system, in alternative examples, components of the vehicle 402 can be associated with the computing device(s) 438 and/or components of the computing device(s) 438 can be associated with the vehicle 402. That is, the vehicle 402 can perform one or more of the functions associated with the computing device(s) 438, and vice versa. Further, aspects of the simulation component 428, the prediction component 432 and/or the planning component 434 can be performed on any of the devices discussed herein. For example, any or all of the functionality and components described with reference to FIGS. 1-3 can be implemented by the planning component 434 or other components of vehicle 402.

Figure 5:
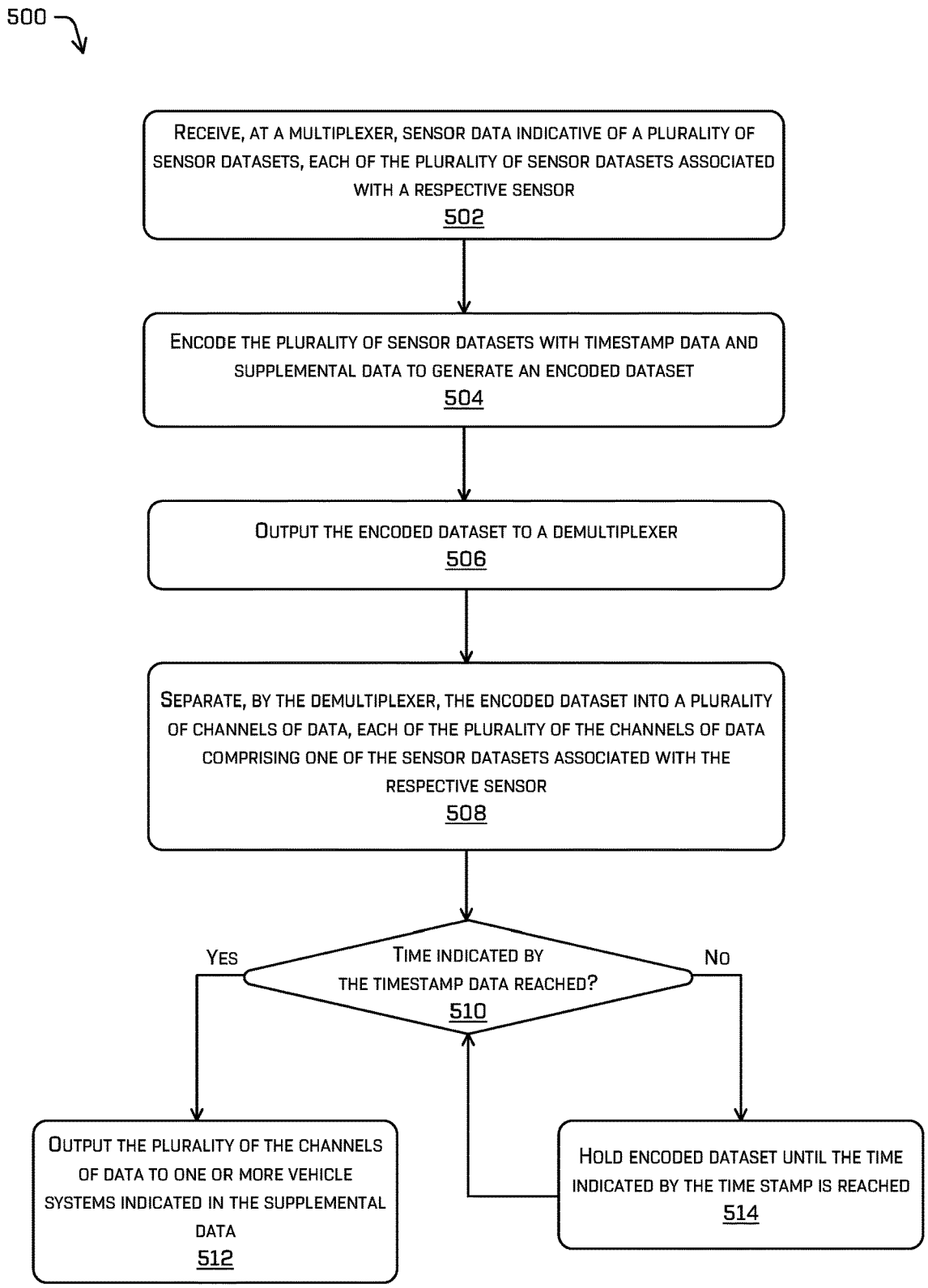
FIG. 5 depicts an example process for encoding sensor data sets associated with respective sensors with timestamp data and supplemental data, separating the encoded data into a plurality of channels, and outputting the channels to vehicle systems indicated in the supplemental data if a time indicated in the timestamp data is reached, in accordance with examples of the disclosure.

FIG. 5 depicts an example process 500 for encoding sensor data sets associated with respective sensors with timestamp data and supplemental data, separating the encoded data into a plurality of channels, and outputting the channels to vehicle systems indicated in the supplemental data if a time indicated in the timestamp data is reached, in accordance with examples of the disclosure. For example, some or all of the process 500 can be performed by one or more components in FIGS. 1, 2, and/or 4, as described herein. For example, some or all of the process 500 can be performed by the vehicle computing device(s) 404, the computing device(s) 438, or any other computing device or combination of computing devices. Further, any of the operations described in the example process 500 may be executed in parallel, in a different order than depicted in the process 500, omitted, combined with other processes, and the like.

An operation 502 includes receiving, at a multiplexer, sensor data indicative of a plurality of sensor datasets, where each of the plurality of sensor datasets is associated with a respective sensor. For example, the multiplexer 106 may receive camera data from one or more camera sensors, lidar data from one or more lidar sensors, radar data from one or more radar sensors, LWIR data from one or more LWIR sensors, and the like. Alternatively or additionally, the multiplexer 106 may receive simulated sensor data indicative of a camera sensor, a lidar sensor, a radar sensor, a LWIR sensor, and so forth. In some cases, the multiplexer 106 may receive log data associated with a camera sensor, a lidar sensor, a radar sensor, a LWIR sensor, and so on.

An operation 504 includes encoding the plurality of sensor datasets with timestamp data and supplemental data to generate an encoded dataset. In some examples, the plurality of sensor datasets included in the encoded dataset may be at least two different types of sensor data (e.g., camera data and lidar data both included in the encoded dataset). The timestamp data may indicate a time that the sensor data included in the encoded dataset should be output by a demultiplexer. Further, the supplemental data may indicate which systems should receive the sensor data, fault injection parameters indicative of a sensor fault or hardware fault to be simulated by the vehicle systems, and so forth. In some cases, the encoded dataset may be an ultra-high-resolution image frame.

An operation 506 includes outputting the encoded dataset to a demultiplexer. For instance, the multiplexer 106 may output the encoded dataset to the demultiplexer 114 via the video output port 112. The video output port 112 may be a display port, HDMI port, a serial port, an ethernet port, and/or a wireless network, to name a few examples.

An operation 508 includes separating, by the demultiplexer, the encoded dataset into a plurality of channels of data, where each of the plurality of the channels of data comprise one of the sensor datasets associated with the respective sensor. Once the channels of data are separated, an operation 510 includes determining whether a time indicated by the timestamp data is reached. In some cases, the demultiplexer 114 may output the channels of data based on a timestamp included in the header 302 of the packet 300 that includes the encoded data, and/or may output the channels of data based on timestamps associated with individual sensors or sensor data types as indicated in the metadata 316. For example, if the response to the operation 510 is "Yes" (e.g., the time indicated by the timestamp data has been reached), the process may proceed to operation 512, in which the plurality of channels of data are output to one or more vehicle systems indicated in the supplemental data. However, if the response to the operation 510 is "No" (e.g., the time indicated by the timestamp data has not yet been reached), the process may proceed to operation 514, in which the encoded dataset is held until the time indicated by the timestamp data has been reached. After time has passed, the process may return to the operation 510 to determine whether the time indicated by the timestamp data has been reached. In this way, simulations can be created to test various vehicle systems with combinations of different sensor data (e.g., simulated data combined with log data) that are output to the vehicle systems more realistically than conventional systems that injected sensor data into software components.

EXAMPLE CLAUSES

A: A system comprising: a multiplexer configured to: receive a first data set associated with a first sensor and a second data set associated with a second sensor; and encode the first data set and the second data set with timestamp data and supplemental data to generate an encoded data set; a video output port communicatively coupled to the multiplexer to transmit the encoded data set from the multiplexer; and a demultiplexer communicatively coupled to the video output port and configured to: receive the encoded data set from the video output port; separate the encoded data set into a first channel of data comprising the first data set and a second channel of data comprising the second data set; and output at least one of the first channel of data or the second channel of data to a vehicle system indicated in the supplemental data and at a time indicated by the timestamp data.

B: The system of paragraph A, wherein encoding the first data set and the second data set is based at least in part on a timing determination, the timing determination being included in the timestamp data.

C: The system of paragraph A or B, wherein: the first data set comprises sensor data generated by or simulated by the first sensor, wherein the first sensor comprises a camera, a lidar sensor, a radar sensor, a long-wave infrared sensor, or a time-of-flight sensor; and the second data set comprises sensor data generated by or simulated by a different one of the camera, the lidar sensor, the radar sensor, the long-wave infrared sensor, or the time-of-flight sensor.

D: The system of any of claims A-C, wherein the demultiplexer comprises a field-programmable gate array (FPGA) or an application-specific integrated circuit (ASIC).

E: The system of any of claims A-D, wherein the supplemental data further comprises at least one of a frame type, a frame size, or a fault injection parameter configured to simulate a sensor fault.

F: The system of any of claims A-E, wherein the multiplexer is further configured to combine the first data set and the second data set into an ultra-high-resolution image frame.

G: A method comprising: receiving, at a multiplexer, a first data set associated with a first sensor and a second data set associated with a second sensor; encoding the first data set and the second data set with timestamp data and supplemental data to generate an encoded data set; and outputting the encoded data set to a demultiplexer.

H: The method of paragraph G, wherein outputting the encoded data comprises outputting the encoded data via a display port, an HDMI port, a serial port, an ethernet port, or a wireless network.

I: The method of paragraph G or H, further comprising: receiving, at the demultiplexer, the encoded data set; separating the encoded data set into a first channel of data comprising the first data set and a second channel of data comprising the second data set; and outputting at least one of the first channel of data or the second channel of data to a vehicle system indicated in the supplemental data and at a time indicated by the timestamp data.

J: The method of any of claims G-I, wherein: the first data set comprises sensor data generated by or simulated by the first sensor, wherein the first sensor comprises a camera, a lidar sensor, a radar sensor, a long-wave infrared sensor, or a time-of-flight sensor; and the second data set comprises sensor data generated by or simulated by a different one of the camera, the lidar sensor, the radar sensor, the long-wave infrared sensor, or the time-of-flight sensor.

K: The method of any of claims G-J, wherein the demultiplexer comprises a field-programmable gate array (FPGA) or an application-specific integrated circuit (ASIC).

L: The method of any of claims G-K, wherein the supplemental data further comprises at least one of a frame type, a frame size, or a fault injection parameter configured to simulate a sensor fault.

M: The method of any of claims G-L, wherein the multiplexer is further configured to combine the first data set and the second data set into an ultra-high-resolution image frame.

N: One or more computer-readable media storing instructions that, when executed by one or more processors, cause the one or more processors to perform operations comprising: receiving, at a multiplexer, a first data set associated with a first sensor and a second data set associated with a second sensor; encoding the first data set and the second data set with timestamp data and supplemental data to generate an encoded data set; and outputting the encoded data set to a demultiplexer.

O: The one or more computer-readable media of paragraph N, wherein outputting the encoded data comprises outputting the encoded data via a display port, an HDMI port, a serial port, an ethernet port, or a wireless network.

P: The one or more computer-readable media of paragraph N or O, the operations further comprising: receiving, at the demultiplexer, the encoded data set; separating the encoded data set into a first channel of data comprising the first data set and a second channel of data comprising the second data set; and outputting at least one of the first channel of data or the second channel of data to a vehicle system indicated in the supplemental data and at a time indicated by the timestamp data.

Q: The one or more computer-readable media of any of claims N-P, wherein: the first data set comprises sensor data generated by or simulated by the first sensor, wherein the first sensor comprises a camera, a lidar sensor, a radar sensor, a long-wave infrared sensor, or a time-of-flight sensor; and the second data set comprises sensor data generated by or simulated by a different one of the camera, the lidar sensor, the radar sensor, the long-wave infrared sensor, or the time-of-flight sensor.

R: The one or more computer-readable media of any of claims N-Q, wherein the demultiplexer comprises a field-programmable gate array (FPGA) or an application-specific integrated circuit (ASIC).

S: The one or more computer-readable media of any of claims N-R, wherein the supplemental data further comprises at least one of a frame type, a frame size, or a fault injection parameter configured to simulate a sensor fault.

T: The one or more computer-readable media of any of claims N-S, wherein the multiplexer is further configured to combine the first data set and the second data set into an ultra-high-resolution image frame.

While the example clauses described above are described with respect to one particular implementation, it should be understood that, in the context of this document, the content of the example clauses can also be implemented via a method, device, system, a computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While individual examples are described herein as having certain features or components, the features and components of the individual examples can be combined and used together. While the operations herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
   a multiplexer configured to:
      receive a first data set associated with a first sensor and a second data set associated with a second sensor; and
      encode the first data set and the second data set with timestamp data and supplemental data to generate an encoded data set, wherein the supplemental data further comprises at least one of a frame type, a frame size, or a fault injection parameter configured to simulate a sensor fault;
   a video output port communicatively coupled to the multiplexer to transmit the encoded data set from the multiplexer; and
   a demultiplexer communicatively coupled to the video output port and configured to:
      receive the encoded data set from the video output port;
      separate the encoded data set into a first channel of data comprising the first data set and a second channel of data comprising the second data set; and
      output at least one of the first channel of data or the second channel of data to a vehicle system indicated in the supplemental data and at a time indicated by the timestamp data.

2. The system of claim 1, wherein encoding the first data set and the second data set is based at least in part on a timing determination, the timing determination being included in the timestamp data.

3. The system of claim 1, wherein:
   the first data set comprises sensor data generated by or simulated by the first sensor, wherein the first sensor comprises a camera, a lidar sensor, a radar sensor, a long-wave infrared sensor, or a time-of-flight sensor; and
   the second data set comprises sensor data generated by or simulated by a different one of the camera, the lidar sensor, the radar sensor, the long-wave infrared sensor, or the time-of-flight sensor.

4. The system of claim 1, wherein the demultiplexer comprises a field-programmable gate array (FPGA) or an application-specific integrated circuit (ASIC).

5. The system of claim 1, wherein the multiplexer is further configured to combine the first data set and the second data set into an ultra-high-resolution image frame.

6. A method comprising:
   receiving, at a multiplexer, a first data set associated with a first sensor and a second data set associated with a second sensor;
   encoding the first data set and the second data set with timestamp data and supplemental data to generate an encoded data set, wherein the supplemental data further comprises at least one of a frame type, a frame size, or a fault injection parameter configured to simulate a sensor fault; and
   outputting the encoded data set to a demultiplexer.

7. The method of claim 6, wherein outputting the encoded data set comprises outputting the encoded data via a display port, an HDMI port, a serial port, an ethernet port, or a wireless network.

8. The method of claim 6, further comprising:
   receiving, at the demultiplexer, the encoded data set;
   separating the encoded data set into a first channel of data comprising the first data set and a second channel of data comprising the second data set; and
   outputting at least one of the first channel of data or the second channel of data to a vehicle system indicated in the supplemental data and at a time indicated by the timestamp data.

9. The method of claim 6, wherein:
   the first data set comprises sensor data generated by or simulated by the first sensor, wherein the first sensor comprises a camera, a lidar sensor, a radar sensor, a long-wave infrared sensor, or a time-of-flight sensor; and
   the second data set comprises sensor data generated by or simulated by a different one of the camera, the lidar sensor, the radar sensor, the long-wave infrared sensor, or the time-of-flight sensor.

10. The method of claim 6, wherein the demultiplexer comprises a field-programmable gate array (FPGA) or an application-specific integrated circuit (ASIC).

11. The method of claim 6, wherein the multiplexer is further configured to combine the first data set and the second data set into an ultra-high-resolution image frame.

12. One or more non-transitory computer-readable media storing instructions that, when executed by one or more processors, cause the one or more processors to perform operations comprising:
  receiving, at a multiplexer, a first data set associated with a first sensor and a second data set associated with a second sensor;
  encoding the first data set and the second data set with timestamp data and supplemental data to generate an encoded data set, wherein the supplemental data further comprises at least one of a frame type, a frame size, or a fault injection parameter configured to simulate a sensor fault; and
  outputting the encoded data set to a demultiplexer.

13. The one or more non-transitory computer-readable media of claim 12, wherein outputting the encoded data comprises outputting the encoded data set via a display port, an HDMI port, a serial port, an ethernet port, or a wireless network.

14. The one or more non-transitory computer-readable media of claim 12, the operations further comprising:
  receiving, at the demultiplexer, the encoded data set;
  separating the encoded data set into a first channel of data comprising the first data set and a second channel of data comprising the second data set; and
  outputting at least one of the first channel of data or the second channel of data to a vehicle system indicated in the supplemental data and at a time indicated by the timestamp data.

15. The one or more non-transitory computer-readable media of claim 12, wherein:
  the first data set comprises sensor data generated by or simulated by the first sensor, wherein the first sensor comprises a camera, a lidar sensor, a radar sensor, a long-wave infrared sensor, or a time-of-flight sensor; and
  the second data set comprises sensor data generated by or simulated by a different one of the camera, the lidar sensor, the radar sensor, the long-wave infrared sensor, or the time-of-flight sensor.

16. The one or more non-transitory computer-readable media of claim 12, wherein the demultiplexer comprises a field-programmable gate array (FPGA) or an application-specific integrated circuit (ASIC).

17. The one or more non-transitory computer-readable media of claim 12, wherein the multiplexer is further configured to combine the first data set and the second data set into an ultra-high-resolution image frame.

18. The one or more non-transitory computer-readable media of claim 12, wherein encoding the first data set and the second data set is based at least in part on a timing determination, the timing determination being included in the timestamp data.

19. The method of claim 6, wherein encoding the first data set and the second data set is based at least in part on a timing determination, the timing determination being included in the timestamp data.

20. The system of claim 1, wherein the multiplexer is further communicatively coupled to at least one of a display port, an HDMI port, a serial port, an ethernet port, or a wireless network to transmit the encoded data set from the multiplexer to the demultiplexer.

* * * * *